Patented Nov. 9, 1943

2,333,754

UNITED STATES PATENT OFFICE 2,333,754

MANUFACTURE OF MIXED RESINS FOR CATION EXCHANGE

Hans Wassenegger, Dessau in Anhalt, Germany; vested in the Alien Property Custodian No Drawing. Application January 31, 1939, Serial No. 253,777. In Germany February 8, 1938

4 Claims. (Cl. 260—45)

The present invention relates to new artificial resins which have cation-exchanging properties.

It is known that artificial resins derived from polyoxybenzenes and aldehydes, particularly formaldehyde, when they have been produced under special conditions have the property of exchanging cations in aqueous saline solutions. The exchange properties and the capacity for exchange at a given pH-value are in high degree dependent on the kind and the number of the groups having a tendency to exchange. Many phenol resins have a commercially useful exchange effect merely in alkaline medium, since they contain only OH-groups as acid residues; their exchange capacity in an acid medium is insufficient.

On the other hand, compounds having strong acid groups capable of imparting a strong capacity for splitting neutral salts and also a satisfactory exchange in acid medium are in general only suitable for use to a limited extent for producing formation of resins having the necessary physical properties for use in exchange filters. Such compounds are amino-, oxy- or aminohydroxy-sulphonic acids of the naphthalene series, for example:

1-amino-naphthalene-3-sulphonic acid
1-amino-naphthalene-5-sulphonic acid
1-amino-naphthalene-2:4-disulphonic acid
1-amino-naphthalene-3:6-disulphonic acid
1-amino-naphthalene-3:8-disulphonic acid
1-amino-naphthalene-3:6:8-trisulphonic acid
1-amino-naphthalene-4:6:8-trisulphonic acid
2-amino-naphthalene-6-sulphonic acid
2-amino-naphthalene-3:6:8-trisulphonic acid
2-amino-naphthalene-4:6:8-trisulphonic acid
1-hydroxy-naphthalene-5-sulphonic acid
1-hydroxy-naphthalene-3-sulphonic acid
1-hydroxy-naphthalene-3:8-disulphonic acid
1-hydroxy-naphthalene-3:6:8-trisulphonic acid
1:8-dihydroxy-naphthalene-3:6-disulphonic acid
2-hydroxy-naphthalene-3:6-disulphonic acid
2-hydroxy-naphthalene-6:8-disulphonic acid
2-hydroxy-naphthalene-3:6:8-trisulphonic acid
1-hydroxy-8-amino-naphthalene-3:6-disulphonic acid
4-hydroxy-2-amino-naphthalene-8-sulphonic acid The present invention relates to the manufacture of valuable exchange bodies from the aforesaid parent materials having strongly acid groups by condensing them with an aldehyde, especially formaldehyde or its equivalent in admixture with other compounds which are capable of forming good resins with aldehydes, especially formaldehyde. Such other compounds, which need not of themselves yield exchange bodies, are, for example, the mono- and polyhydroxy-benzenes and their derivatives as well as urea, thiourea and their derivatives or preliminary condensation products. The term "a phenol" as used in the claims is to be construed as covering both mono- and polyhydric phenols.

By this mixed condensation and subsequent cautious drying there are obtained resin gels which combine the good properties of the resin former with the exchange activity of the other components. In this manner the final body unites the insolubility, stability towards acid and dilute alkalies, the stability of form and a suitable resistance to swelling with high capacity for splitting neutral salts and high exchange capacity.

The following examples illustrate the invention, the parts being by weight:

*Example 1*

In a solution adjusted to alkalinity towards methyl-orange of 1100 parts of resorcinol and 600 parts of disodium-1-naphthylamine-3:6:8-trisulphonate in 4000 parts of water are introduced, while stirring, at 0–4° C., 1800 parts of formaline of 30 per cent strength. The temperature rises to 45° C. and the solution solidifies to a jelly with evolution of gas. After drying at 50° C. in a vacuum and comminuting to particles of 0.5–1.5 millimetre diameter, the material, when used for softening water, takes up 15 grams of CaO per litre.

*Example 2*

Into a solution of 1100 parts of resorcinol and 500 parts of sodium-1:8-dihydroxynaphthalene-3:6-disulphonate in 2000 parts of water, which solution has been made alkaline to methyl-orange by means of caustic soda lye, are introduced, while stirring, at 15° C. 1800 parts of formaline of 30 per cent strength. The temperature of the mixture rises spontaneously to about 90° C. and the mixture solidifies. The jelly produced is dried at 80° C. and constitutes a resin with a capacity for 16 grams of CaO per litre when used for softening water.

*Example 3*

55 parts of resorcinol and 15 parts of the sodium salt of 2-amino-4-naphthol-6:8-disulphonic acid are dissolved together with 6 parts by volume of concentrated caustic soda solution in 77 parts of water and mixed with 67 parts of formaline of 30 per cent strength. The solution becomes warm and solidifies to a jelly, which is dried at about 80° C. and is broken into small pieces of a size of 0.5–1.5 mm. 1 kilo of the material, when used as the hydrogen ion exchanger, takes up 27.5 grams of CaO upon filtration with a 10 per cent. neutral solution of calcium chloride until the solution passes the filter.

*Example 4*

To a solution of 165 parts of resorcinol, 75 parts of the sodium salt of 1-amino-8-naphthol-3:6-disulphonic acid and 30 parts by volume of concentrated caustic soda solution in 200 parts of water there are added at 20° C. 240 parts of formaline of 30 per cent strength. The solution solidifies with the evolution of heat to a jelly, which is dried at 85° C. and is then broken up. 1 kilo of the material, when used as a hydrogen ion exchanger, takes up 26.5 grams of CaO upon filtration with a 10 per cent neutral solution of calcium chloride until the solution passes the filter.

*Example 5*

To a solution of 22 parts of resorcinol, 8 parts of the sodium salt of 1-naphthol-3:8-disulphonic acid and 3 parts by volume of concentrated caustic soda solution in 34 parts of water there are added at 25° C. 32 parts of formaline of 30 per cent strength, whereupon the mixture with evolution of heat solidifies to a jelly. As described under Example 3, the product is dried and broken up. 1 kilo of the material, when used as a hydrogen ion exchanger, takes up 19.2 grams of CaO upon filtration of a 10 per cent neutral solution of calcium chloride until the solution passes the filter.

*Example 6*

100 parts of phenol, 27 parts of the sodium salt of 1:8-dihydroxynaphthalene-3:6-disulphonic acid and 20 parts of concentrated caustic soda solution are dissolved in 100 parts of water. The solution is boiled with 200 parts of formaline of 30 per cent strength and after subsequent solidification is kept for 18 hours at 80–100° C. After drying and comminution as described under Example 3, 1 kilo of the material, when used as a hydrogen ion exchanger, takes up 27.8 grams of CaO upo filtration of a 10 per cent. neutral solution of calcium chloride until the solution passes the filter.

*Example 7*

500 parts of phenol, 200 parts of the sodium salt of 1-naphthol-3:8-disulphonic acid and 8 parts of concentrated caustic soda solution are heated with 500 parts of water to 45° C. After the addition of 900 parts of formaline of 30 per cent strength the mixture is slowly heated and finally boiled until a jelly is formed, which is kept at 80–100° C. for a further 15 hours. As described under Example 3, the product is dried and comminuted, and takes up per kilo 28.7 grams of CaO, when used as a hydrogen ion exchanger, upon filtration of a 10 per cent. neutral solution of calcium chloride until the solution passes the filter.

The absorption capacities of the products of Example 3 to Example 7 is determined as follows:

The products are swollen in water and then allowed to stand for ½ hour in hydrochloric acid (1:1). Then a neutral solution of calcium chloride of 10 per cent strength is filtered over until no more calcium is absorbed by the resin. This can readily be recognised by the originally acid filtrate becoming neutral. The charged resin is washed free from chlorine and regenerated with a solution of common salt of 10 per cent. strength. The calcium thereby exchanged is then determined.

*Example 8*

1100 parts of resorcinol, 440 parts of the sodium salt of 1-amino-naphthalene-6:8-disulphonic acid are dissolved together with 100 parts by volume of concentrated caustic soda solution in 1000 parts of water and 1700 parts of formaline of 30 per cent. strength are added at 20° C. The solution becomes warm and solidifies to a jelly which is dried at 80–100° C. After comminution to a size of 0.5–1.5 mm. diameter the material when used as a neutral exchanger takes up about 12 grams of CaO per litre.

*Example 9*

In a solution of 110 parts of resorcinol, 47 parts of the sodium salt of 2-hydroxy-naphthalene-6-sulphonic-3-carboxylic acid and 10 parts by volume of a concentrated caustic soda lye in 170 parts of water are introduced, while stirring, 170 parts of formaline of 30 per cent. strength. The mixture becomes warm and solidifies to a jelly which is dried at 80° C. After comminution to a size of 0.5–2.5 mm. diameter the material, when used as a hydrogen ion exchanger takes up about 9 grams of CaA per litre.

*Example 10*

425 parts of the sodium salt of 2:3:8-trihydroxy-naphthalene-6-sulphonic acid and 330 parts of resorcinol are dissolved together with 50 parts by volume of concentrated caustic soda solution in 600 parts of water and 750 parts of formaline of 30 per cent. strength are added at 20° C. The resulting jelly is dried at 80–90° C. and may be charged after comminution with about 14 parts of CaO per litre.

*Example 11*

1100 parts of resorcinol, 400 parts of the sodium salt of 1-amino-naphthalene-5:7-disulphonic acid and 100 parts by volume of concentrated caustic soda solution are dissolved in 1700 parts of water and 1600 parts of formaline of 30 per cent. strength are added at 20° C. The resulting jelly is worked up in the usual way. The material may take up about 10 g. of CaO per litre.

*Example 12*

1100 parts of resorcinol, 300 parts of the sodium salt of 1:8-dihydroxy-naphthalene-2:4-disulphonic acid and 50 parts by volume of concentrated caustic soda solution are dissolved in 1100 parts of water and 1700 parts of formaline of 30 per cent. strength are added at 20° C. The resulting jelly is worked up in the usual way. The material may be charged with about 11 g. of CaO per litre.

Of course the invention is not limited to the specific details described, for obvious modification may occur to a person skilled in the art.

What I claim is:

1. The process of preparing cation-exchanging resins which comprises condensing in an alkaline solution a member of the group consisting of an amino-, hydroxy- and amino-hydroxy-sulphonic acid of the naphthalene series and a phenol with formaldehyde, while using at least 2 mols of the phenol for each mol of the naphthalene sulfonic acid, the amount of the phenol not being so high as to impair the utility of the resin in acid media, the resin formation being carried so far that the final product is insoluble in water, acids and dilute alkalis.

2. The process of preparing cation-exchanging resins which comprises condensing in an alkaline solution a member of the group consisting of an amino-, hydroxy- and amino-hydroxy-sulphonic acid of the naphthalene series and a phenol with formaldehyde, while using at least 2 mols of the phenol for each mol of the naphthalene sulfonic acid, the amount of the phenol not being so high as to impair the utility of the resin in acid media, the resulting jelly being carefully dried so that the gel structure is maintained.

3. The process of preparing cation-exchanging resins which comprises condensing in an alkaline solution 1-hydroxy-naphthalene-3:8-disulphonic acid and phenol with formaldehyde, while using at least 2 mols of the phenol for each mol of the naphthalene sulfonic acid, the amount of the phenol not being so high as to impair the utility of the resin in acid media, the resin formation being carried so far that the final product is insoluble in water, acids and dilute alkalis.

4. Artificial resins obtained according to claim 1 having cation-exchanging properties in alkaline and acid media.

HANS WASSENEGGER.